United States Patent
Ito (10) Patent No.: US 12,019,360 B2
(45) Date of Patent: Jun. 25, 2024

(54) CHROMATICITY ADJUSTMENT METHOD AND PROJECTOR

(71) Applicant: Sharp NEC Display Solutions, Ltd., Tokyo (JP)

(72) Inventor: Kaoru Ito, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 321 days.

(21) Appl. No.: 17/421,998

(22) PCT Filed: Jan. 30, 2019

(86) PCT No.: PCT/JP2019/003086
§ 371 (c)(1),
(2) Date: Jul. 9, 2021

(87) PCT Pub. No.: WO2020/157843
PCT Pub. Date: Aug. 6, 2020

(65) Prior Publication Data
US 2022/0100069 A1 Mar. 31, 2022

(51) Int. Cl.
*G03B 21/20* (2006.01)
*H04N 9/31* (2006.01)

(52) U.S. Cl.
CPC ....... *G03B 21/206* (2013.01); *G03B 21/2013* (2013.01); *H04N 9/3158* (2013.01); *H04N 9/3182* (2013.01)

(58) Field of Classification Search
CPC .............. G03B 21/206; G03B 21/2013; H04N 9/3158; H04N 9/3182; H04N 9/73;
(Continued)

(56) References Cited

U.S. PATENT DOCUMENTS

| 2003/0227577 A1* | 12/2003 | Allen | H04N 9/3155 |
| | | | 348/742 |
| 2003/0231260 A1* | 12/2003 | Pate | G02B 26/008 |
| | | | 348/602 |

(Continued)

FOREIGN PATENT DOCUMENTS

| JP | 2011-145368 A | 7/2011 |
| JP | 2013-054167 A | 3/2013 |

(Continued)

OTHER PUBLICATIONS

International Search Report (ISR) (PCT Form PCT/ISA/210), in PCT/JP2019/003086, dated Apr. 16, 2019.

*Primary Examiner* — John W Miller
*Assistant Examiner* — Sean N. Haiem
(74) *Attorney, Agent, or Firm* — MCGINN I.P. LAW GROUP, PLLC (57) ABSTRACT

A chromaticity adjusting method of a projector includes a first light source for emitting blue light and a second light source for emitting yellow light including red light and green light. A chromaticity value of the blue light is acquired and the chromaticity value and the luminance value of each of the red light and the green light is obtained. The second target chromaticity value is determined based on the first target chromaticity value, the chromaticity value of the blue light, and the chromaticity value and the luminance value of each of the red light and the green light. Light quantities of the first and second light sources are controlled based on the second target chromaticity value. Signal levels of the red, green, and blue color components included in the video signal are controlled according to the difference between the first target chromaticity value and the second target chromaticity value.

17 Claims, 5 Drawing Sheets

(58) Field of Classification Search
CPC .......... H04N 9/68; H04N 9/3194; G09G 5/02; G09G 3/2003; G09G 3/3607
USPC ....................................................... 348/744
See application file for complete search history.

(56) References Cited

U.S. PATENT DOCUMENTS

| | | | | |
|---|---|---|---|---|
| 2004/0008288 | A1* | 1/2004 | Pate | H04N 9/3114 348/742 |
| 2014/0028697 | A1* | 1/2014 | Kurtz | G01J 3/465 345/589 |
| 2014/0028698 | A1* | 1/2014 | Maier | G09G 5/02 345/589 |
| 2014/0028699 | A1* | 1/2014 | Kurtz | H04N 9/3182 345/590 |
| 2014/0192331 | A1* | 7/2014 | Toyooka | G03B 21/2053 353/121 |
| 2016/0062121 | A1* | 3/2016 | Border | G02B 27/0176 359/630 |
| 2016/0100141 | A1* | 4/2016 | Hosoi | G02B 26/008 353/121 |
| 2019/0025588 | A1* | 1/2019 | Osterhout | H04N 23/60 |
| 2020/0218142 | A1* | 7/2020 | Vetsuypens | H04N 9/3155 |

FOREIGN PATENT DOCUMENTS

| | | |
|---|---|---|
| JP | 2014-021227 A | 2/2014 |
| JP | 2015-118224 A | 6/2015 |

* cited by examiner

CHROMATICITY ADJUSTMENT METHOD AND PROJECTOR

TECHNICAL FIELD

The present invention relates to a method for adjusting the chromaticity of a projector.

BACKGROUND ART

Patent Document 1 describes a projector that includes a light source device that emits a mixed light made up of blue light and yellow light, a light modulator that forms an image by modulating light emitted from the light source device based on a video signal, and a projection optical system that projects the image. The light modulator includes a light modulator for red, a light modulator for green and a light modulator for blue.

The light source device includes a first light source that emits blue laser light and a second light source that emits yellow fluorescent light. The light source device is configured to synthesize the blue light emitted from the first light source and the yellow fluorescent light emitted from the second light source to emit the synthesized light in the same optical path. Yellow fluorescent light includes red light and green light. By synthesizing yellow fluorescent light and blue light, white light can be obtained.

The light emitted from the light source device is separated into red light, green light, and blue light. Red light is incident on the light modulator for red. Green light is incident on the light modulator for green. Blue light is incident on the light modulator for blue.

The light modulator for red forms a red image by modulating the red light based on the red component signal (red image signal) included in the video signal. The light modulator for green forms a green image by modulating green light based on the green component signal (green image signal) included in the video signal. The light modulator for blue forms a blue image by modulating blue light based on the blue component signal (blue image signal) included in the video signal.

The projection optical system projects a color image composed of a red image, a green image, and a blue image on a screen.

Incidentally, as a chromaticity adjusting method for obtaining a desired white balance, there are known a method of adjusting a ratio of red light, green light, and blue light included in projected light, and a method of adjusting a signal level of each color component of red, green, and blue included in a video signal. In the projector provided with the light source device that emits the mixed light of the blue light and the yellow light as described above, the ratio of the blue light and the yellow light can be adjusted by controlling the quantities of light of the first and second light sources, but it is difficult to adjust the ratio of the blue light, the red light, and the green light. Therefore, rather than controlling the quantity of light of the light source, it is common to use a chromaticity adjustment method for controlling the signal level of each color component of the red, green and blue of the video signal.

PRIOR ART DOCUMENT

Patent Document

Patent Document 1: Japanese Patent Laid-Open No. 2013-54167

DISCLOSURE OF THE INVENTION

Problems to be Solved by the Invention

However, in the chromaticity adjustment method for controlling the signal level of each color component of the video signal as described above, since the light quantity of the first and second light sources is constant, when lowering the red, green or blue signal level, there is a problem that the utilization efficiency of light is reduced. For example, when the blue signal level is lowered, in the quantity of blue light from the first light source, the light quantity corresponding to the lowered amount of the signal level is not used to form the blue image and is wasted.

An object of the present invention is to provide a chromaticity adjusting method and a projector capable of solving the above problems and improving the light utilization efficiency.

Means for Solving the Problems

In order to achieve the above object, according to one aspect of the present invention, there is provided a chromaticity adjustment method of a projector comprising a light source unit that includes a first light source that emits blue light; and a second light source that emits yellow light including red light and green light, said light source unit being configured to emit a mixed light made up of the blue light and the yellow light, said projector being configured to modulate emitted light from said light source unit based on a video signal to form an image, said method comprising: acquiring at least a chromaticity value of the blue light and obtaining a chromaticity value and a luminance value of each of the red light and the green light; determining a second target chromaticity value based on a first target chromaticity value set in advance, the chromaticity value of the blue light, and the chromaticity value and the luminance value of each of the red light and the green light; controlling light quantities of said first and second light sources based on the second target chromaticity value; and controlling a signal level of each color component of red, green, and blue included in the video signal in response to a difference between the first target chromaticity value and the second target chromaticity value.

According to another aspect of the present invention, there is provided a projector comprising: a light source unit that includes a first light source that emits blue light and a second light source that emits yellow light including red light and green light, said light source unit being configured to emit a mixed light made up of the blue light and the yellow light; an image forming means for modulating emitted light from said light source unit based on a video signal to form an image; a projection lens that projects the image; and a control unit that controls a light quantity of each of said first and second light sources so that a chromaticity value of the emitted light of said light source unit becomes a second target chromaticity value that is determined based on a first target chromaticity value set previously, a chromaticity value of the blue light, and a chromaticity value and a luminance value of each of the red light and the green light; and that controls a signal level of each color component of red, green, and blue included in the video signal in accordance with a difference between the first target chromaticity value and the second target chromaticity value.

EXAMPLE EMBODIMENTS

Next, example embodiments of the present invention will be described with reference to the drawings.

First Example Embodiment

Figure 1:
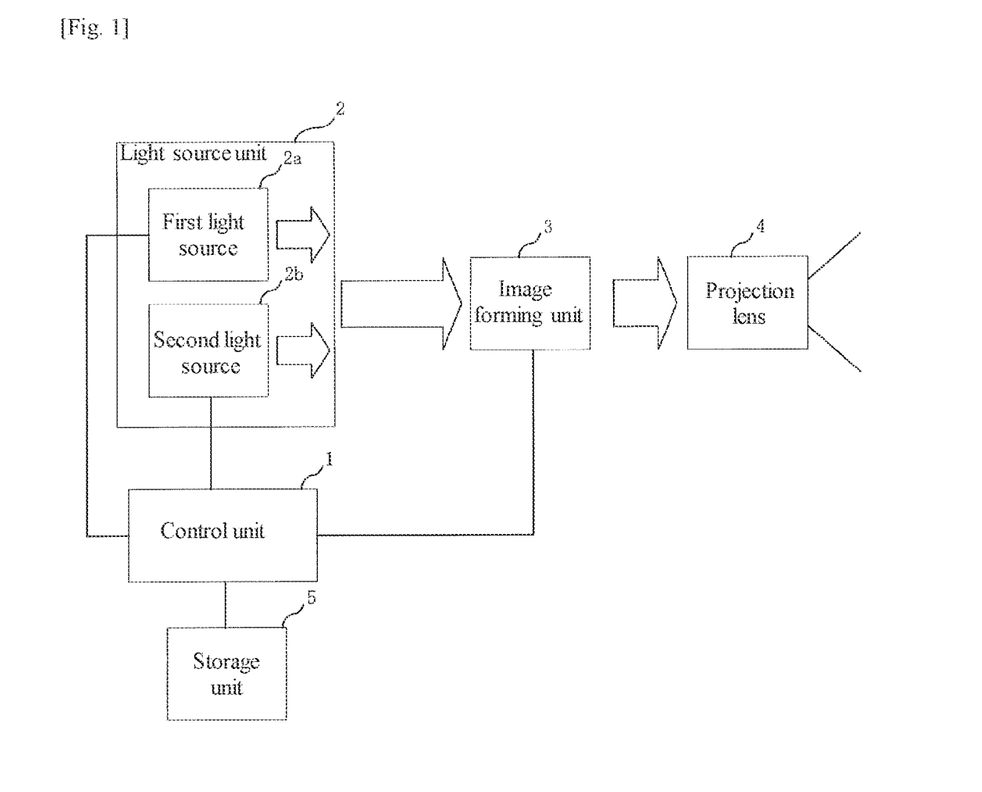
FIG. 1 is a block diagram showing a configuration of a projector to which a chromaticity adjustment method according to a first example embodiment of the present invention is applied.

FIG. 1 is a block diagram showing a configuration of a projector to which a chromaticity adjustment method according to a first example embodiment of the present invention is applied.

The projector shown in FIG. 1 includes control unit 1, light source unit 2, image forming unit 3, projection lens 4, and storage unit 5. Light source unit 2 includes first light source 2a that emits blue (B) light and second light source 2b that emits yellow (Y) light including red (R) light and green (G) light, and emits a mixed light made up of blue light and yellow light. Blue light and yellow light are mixed to obtain white light.

Image forming unit 3 modulates an emitted light from light source unit 2 based on the video signal to form an image. Image forming unit 3 may be configured by a LCD (Liquid Crystal Display) panel, a DMD (Digital Micromirror Device), or the like.

Further, image forming unit 3 may include a light modulator for red, a light modulator for green, and a light modulator for blue. In this case, white light, which is the emitted light from light source unit 2, is separated into red light, green light, and blue light. Red light is incident on the light modulator for red. Green light is incident on the light modulator for green. Blue light is incident on the light modulator for blue. The light modulator for red forms a red image by modulating the red light based on the red component signal (red image signal) included in the video signal. The light modulator for green forms a green image by modulating the green light based on the green component signal (green image signal) included in the video signal. The light modulator for blue forms a blue image by modulating the blue light based on the blue component signal (blue image signal) included in the video signal.

Image forming unit 3 may form a red image, a green image, and a blue image in a time-division manner. In this case, for example, a color wheel, in which a red filter, a color wheel green filter and a blue filter are arranged side by side in the circumferential direction, is used to separate the emitted light (white light) from light source unit 2 into red light, green light and blue light. Then, red light, green light and blue light are incident on image forming unit 3 in this order. Image forming unit 3 modulates the red light on the basis of the red component signal (a red image signal) to form a red image, modulates the green light on the basis of the green component signal (a green image signal) to form a green image, and modulates the blue light on the basis of the blue component signal (a blue image signal) to form a blue image.

Control unit 1 performs chromaticity adjustment in order to obtain a desired white balance. The chromaticity adjustment includes a light quantity control for controlling the light quantities of first light source 2a and second light source 2b, and a signal level control for controlling the signal level of each color component of red, green and blue included in the video signal.

In the light quantity control, control unit 1 controls the light quantities of first light source 2a and second light source 2b so that the chromaticity value of emitted light from light source unit 2 becomes a second target chromaticity value which is determined on the basis of a first target chromaticity value (final target) set in advance, the chromaticity value of the B light, and the chromaticity value and the luminance value of each colored light of R and G. In the signal level control, control unit 1 controls the signal level of each color component of R, G, and B included in the video signal in accordance with the difference between the first target chromaticity value and the second target chromaticity value.

Hereinafter, the procedure of the chromaticity adjustment method of the present embodiment will be described in detail.

Figure 2:
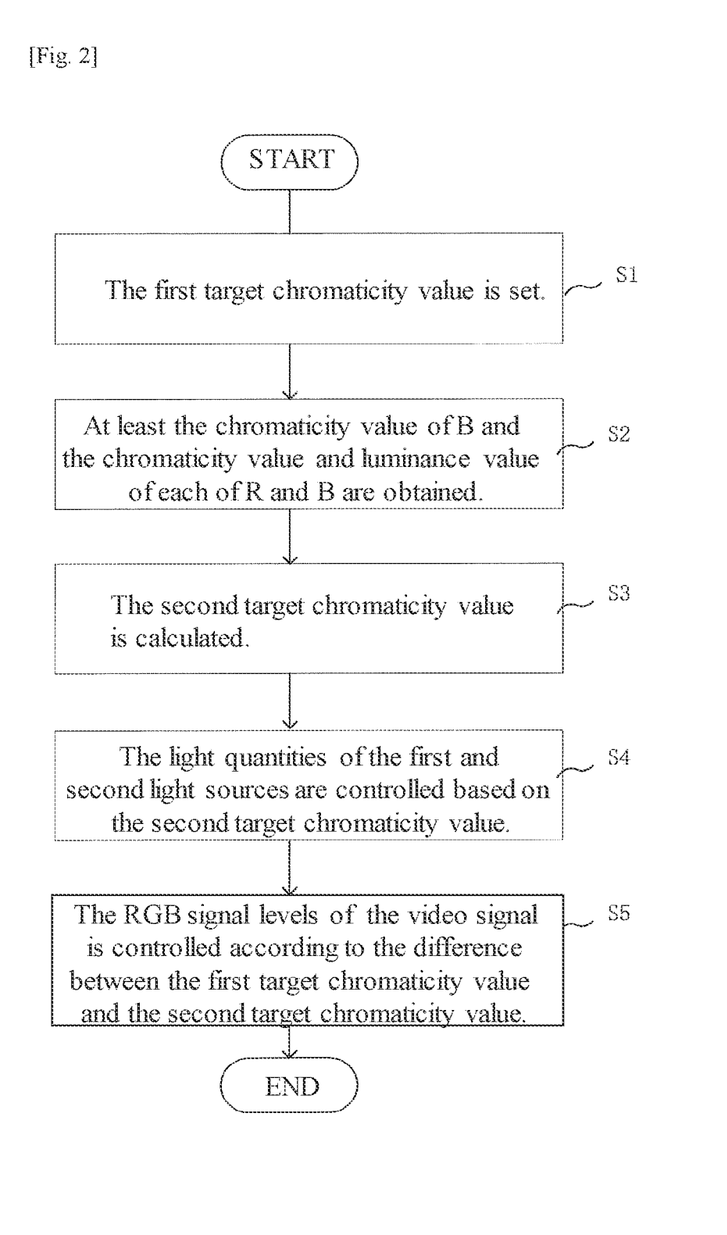
FIG. 2 is a flowchart showing a procedure of the chromaticity adjustment method according to the first example embodiment of the present invention.

FIG. 2 is a flowchart showing the procedure of the chromaticity adjustment method of the present embodiment.

First, control unit 1 sets a first target chromaticity value (step S1). The first target chromaticity value is a target chromaticity value for obtaining a desired white balance, and can be arbitrarily set.

Next, control unit 1 acquires at least the chromaticity value of the B light and the chromaticity value and the luminance value of each of R light and G light (step S2). In order to obtain the chromaticity value and the luminance value of RGB, for example, a color illuminometer or an optical sensor such as a color sensor can be used. Here, it is assumed that a color illuminometer is used. Control unit 1 causes image forming unit 3 to form an all-red image, an all-green image, and an all-blue image as adjustment images. The color illuminometer receives an all-red image light to output the chromaticity value and the luminance value of red light, receives an all-green image light to output the chromaticity value and the luminance value of green light, and receives an all-blue image light to output the chromaticity value and the luminance value of blue light. Control unit 1 can acquire the chromaticity value and the luminance value of RGB based on the output value of the color illuminometer.

Next, control unit 1 determines a second target chromaticity value based on the first target chromaticity value, the chromaticity value of B and the chromaticity value and the luminance value of each of R and G obtained in step S2 (step S3).

For example, control unit 1 calculates the chromaticity value of yellow (Y) light based on the chromaticity value and the luminance value of each of R and G acquired in step S2. Then, control unit 1 determines the second target chromaticity value as follows, using the xy chromaticity diagram represented by the two-dimensional coordinates of x and y from among a tristimulus value of a color stimulus. Here, the xy chromaticity diagram is a CIE xy chromaticity diagram, specifically, a chromaticity diagram of CIE1391 color space. CIE is an abbreviation for "Commission Internationale de l'Éclairage" (in French).

In the second target chromaticity value determination processing, first, control unit 1 obtains a first straight line that connects the coordinate point of the chromaticity value of R with the coordinate point of the first target chromaticity value on the xy chromaticity diagram. Next, control unit 1 obtains a second straight line that connects the coordinate point of the chromaticity value of B with the coordinate point of the chromaticity value of Y on the xy chromaticity diagram. Next, control unit 1 obtains a third straight line that connects between the coordinate point of the chromaticity value of G with the coordinate point of the first target chromaticity value on the xy chromaticity diagram. Then, control unit 1, on the xy chromaticity diagram, compares the coordinate value of the intersection of the first straight line and the second straight line with the coordinate value of the intersection of the second straight line and the third straight line, and determines the second target chromaticity value based on the coordinate value of which the value of y is larger.

Next, control unit 1 controls the light quantities of first light source 2a and second light source 2b based on the second target chromaticity value (step S4).

Finally, control unit 1 controls the signal level of each color component of R, G, and B included in the video signal in accordance with the difference between the first target chromaticity value and the second target chromaticity value (Step S5). Thus, a desired white balance is obtained.

According to the chromaticity adjusting method described above, the following operation and effect can be obtained.

In light source unit 2 that emits mixed color light (white light) of blue light and yellow light, the ratio of blue light and yellow light included in the mixed color light can be adjusted by controlling the light quantities of first light source 2a and second light source 2b, but the ratio of blue light, red light, and green light cannot be individually adjusted. Therefore, only the light quantity control of light source unit 2 may not obtain the desired white balance.

In the chromaticity adjustment method shown in FIG. 2, the light quantity control of light source unit 2 is performed, and the signal level control for controlling the signal level of each color component of R, G, and B of the video signal is performed. Since the portion that can not be adjusted only by the light quantity control of light source unit 2 is adjusted by using the signal level control, it is possible to obtain the desired white balance.

The second target chromaticity value is determined based on the chromaticity value of B, the chromaticity value and the luminance value of each of R and G, and the first target chromaticity value which is the final target for obtaining the desired white balance. Based on the second target chromaticity value thus determined, by controlling the light quantities of first light source 2a and second light source 2b, as much as possible, the chromaticity value of the emitted light from light source unit 2 approaches the first target chromaticity value. Thus, it is possible to prevent a decrease in light utilization efficiency caused by the signal level control.

Hereinafter, the effect of preventing the decrease in the light utilization efficiency will be described in detail.

A configuration, in which a chromaticity adjustment method in which only a signal level control is performed is applied to the projector shown in FIG. 1, is used as a comparative example. In this comparative example, the signal level of blue is lowered to obtain a final target chromaticity value. In this case, from among the light quantity of first light source 2a (the light quantity of blue light), the light quantity corresponding to the amount of decrease in the signal level does not contribute to the formation of a blue image and is wasted.

On the other hand, according to the chromaticity adjustment method shown in FIG. 2, the light quantity of first light source 2a is reduced by performing the light amount control. By reducing the light quantity of blue light, the adjustment amount of the signal level of blue can be smaller than the amount of reduction of the signal level of the above comparative example, as a result of which, the light quantity of blue light wasted during the formation of the blue image can be reduced.

In the comparative example, the signal level of green and the signal level of red are lowered to obtain a final target chromaticity value (the first target chromaticity value). In this case, from among the light quantity of red light included in the emitted light from second light source 2b, the light quantity corresponding to the amount of reduction of the red signal level does not contribute to the formation of a red image and is wasted. Similarly, from among the light quantity of green light included in the emitted light from second light source 2b, the light quantity corresponding to the amount of reduction of the green signal level does not contribute to the formation of a green image and is wasted.

On the other hand, according to the chromaticity adjustment method shown in FIG. 2, the light quantity of second light source 2b (the light quantities of red light and green light) is reduced by performing the light quantity control. Since the light quantities of red light and green light are reduced, the adjustment amounts of the red and green signal levels can be made smaller than in the case of the comparative example. As a result, it is possible to reduce the light quantity of the red light that is wasted at the time when a red image is formed, and it is possible to reduce the light quantity of the green light that is wasted at the time when a green image is formed.

Further, according to the chromaticity adjustment method shown in FIG. 2, in addition to the effect of preventing the decrease in the light utilization efficiency, by reducing the light quantity of first light source 2a or second light source 2b, the power consumption can be reduced.

Furthermore, in the projector, light source unit 2 itself generates heat, and when light from light source unit 2 passes through the optical component, the optical component also generates heat. Therefore, cooling fans for cooling light source unit 2 and the optical component are usually provided in the projector. According to the chromaticity adjustment method shown in FIG. 2, by reducing the light quantity of first light source 2a or second light source 2b, the amount of heat generated in light source unit 2 and the optical component is reduced. As a result, it is possible to reduce the rotational speed of the cooling fans, and it is possible to reduce the noise generated by rotating the cooling fans.

Incidentally, in the projector shown in FIG. 1, the driving values of first light source 2a and second light source 2b for performing the light quantity control and the gain value of the signal of each color component of R, G, and B for performing the signal level control may be stored in storage unit 5. For example, before shipment of the projector, the chromaticity adjustment may be performed by the procedure shown in FIG. 2 to store the driving values of first light source 2a and second light source 2b and the gain value of the signal of each color component of R, G, and B in storage unit 5. In this case, when the user starts the projector after receiving it, control unit 1 drives first light source 2a and second light source 2b based on the driving value stored in storage unit 5, and adjusts the signal level of each color component of R, G, and B of the video signal based on the gain values stored in storage unit 5.

Further, in the projector illustrated in FIG. 1, a color temperature setting unit which is capable of selectively setting a color temperature from among a plurality of color temperatures may be provided. In this case, the first target chromaticity value is set for each color temperature. Storage unit 5 stores, for each color temperature, the respective driving values of first light source 2a and second light source 2b corresponding to the second target chromaticity value and the gain value of the signal of each color component of R, G, and B corresponding to the difference between the first target chromaticity value and the second target chromaticity value in association with each other. When the color temperature is selected by the color temperature setting unit, control unit 1 acquires the driving value and the gain value that correspond to the selected color temperature from storage unit 5.

Further, in the projector shown in FIG. 1, second light source 2b may include an excitation light source that emits blue excitation light and a phosphor that is excited by blue excitation light and emits yellow fluorescent light.

First light source 2a and the excitation light source may be composed of a solid-state light source such as LD (laser diode) or LED (light emitting diode). Second light source 2b may include a phosphor wheel. The phosphor wheel includes, for example, a transparent rotating substrate and a phosphor layer formed along the circumferential direction on the rotating substrate. The phosphor layer includes a phosphor that emits yellow fluorescent light.

Further, in the chromaticity adjustment method shown in FIG. 2, in step S3, control unit 1 may compare the coordinate value of the intersection of the first straight line and the second straight line with the coordinate value of the intersection of the second straight line and the third straight line, and determines the second target chromaticity value based on the coordinate value of which the value of y is smaller. However, the luminance of the projected image when the second target chromaticity value is determined based on the coordinate value of which the value of y is smaller is smaller than the luminance of the projected image when the second target chromaticity value is determined based on the coordinate value of which the value of y is larger.

Second Example Embodiment

Figure 3:
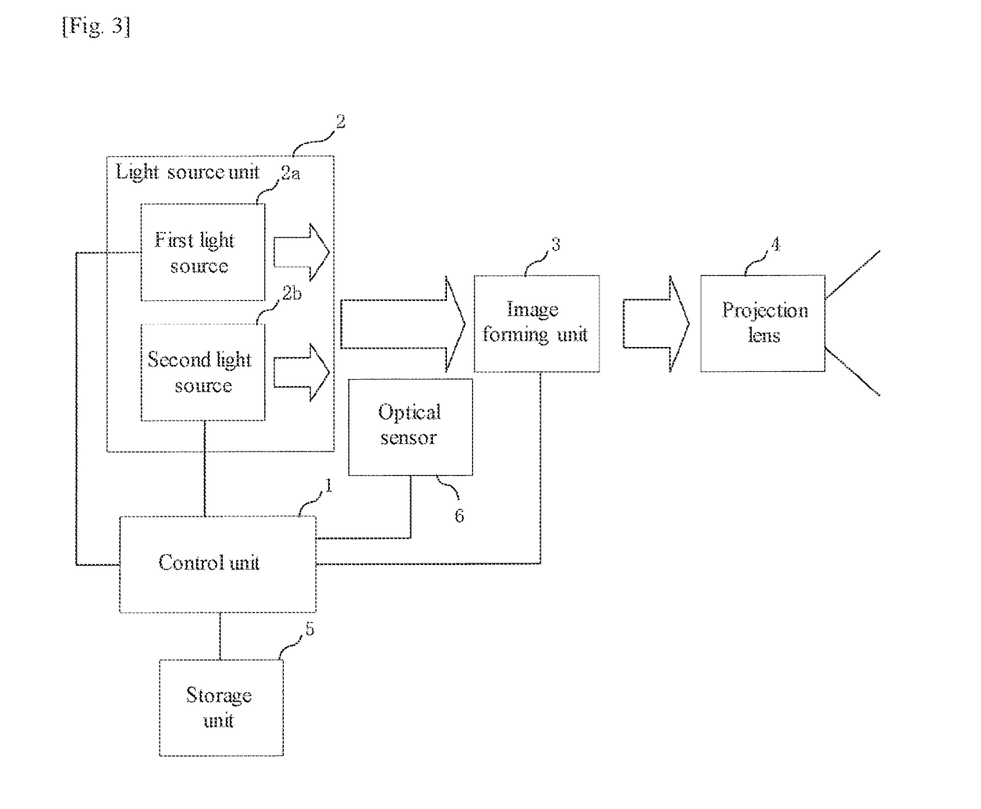
FIG. 3 is a block diagram showing a configuration of a projector according to a second example embodiment of the present invention.

FIG. 3 is a block diagram showing a configuration of a projector according to the second embodiment of the present invention.

The projector shown in FIG. 3 is obtained by adding optical sensor 6 to the configuration of the projector shown in FIG. 1. Regarding the same configuration as that of the projector shown in FIG. 1, detailed descriptions are omitted.

Light sensor 6 can detect a portion of the emitted light from light source unit 2 to output the chromaticity value and the luminance value of each color light of R, G and B. Optical sensor 6 may be any constitution in which the respective chromaticity values and luminance values of R, G and B can be output. For example, optical sensor 6 may be composed of an RGB color sensor or the like.

Control unit 1, based on the output of optical sensor 6, performs chromaticity adjustment in accordance with the procedure shown in FIG. 2. The operation related to the chromaticity adjustment is as described in the first example embodiment.

The projector of the present embodiment also exhibits the same effect as that of the first embodiment.

In the projector of the present embodiment, optical sensor 6 is provided to detect unnecessary light of light source unit 2 (i.e., light that does not contribute to image formation). Unnecessary light may be light that is leaked from light source unit 2. Further, a portion of emitted light from light source unit 2 may be taken out by using a mirror having a characteristic such as to reflect a few percent of light in the red, green and blue wavelength ranges and to transmit the remainder. In this case, optical sensor 6 detects the reflected light from the mirror.

The configuration described in the first example embodiment (including the modification) can be applied to the projector of the present embodiment.

Third Example Embodiment

Figure 4:
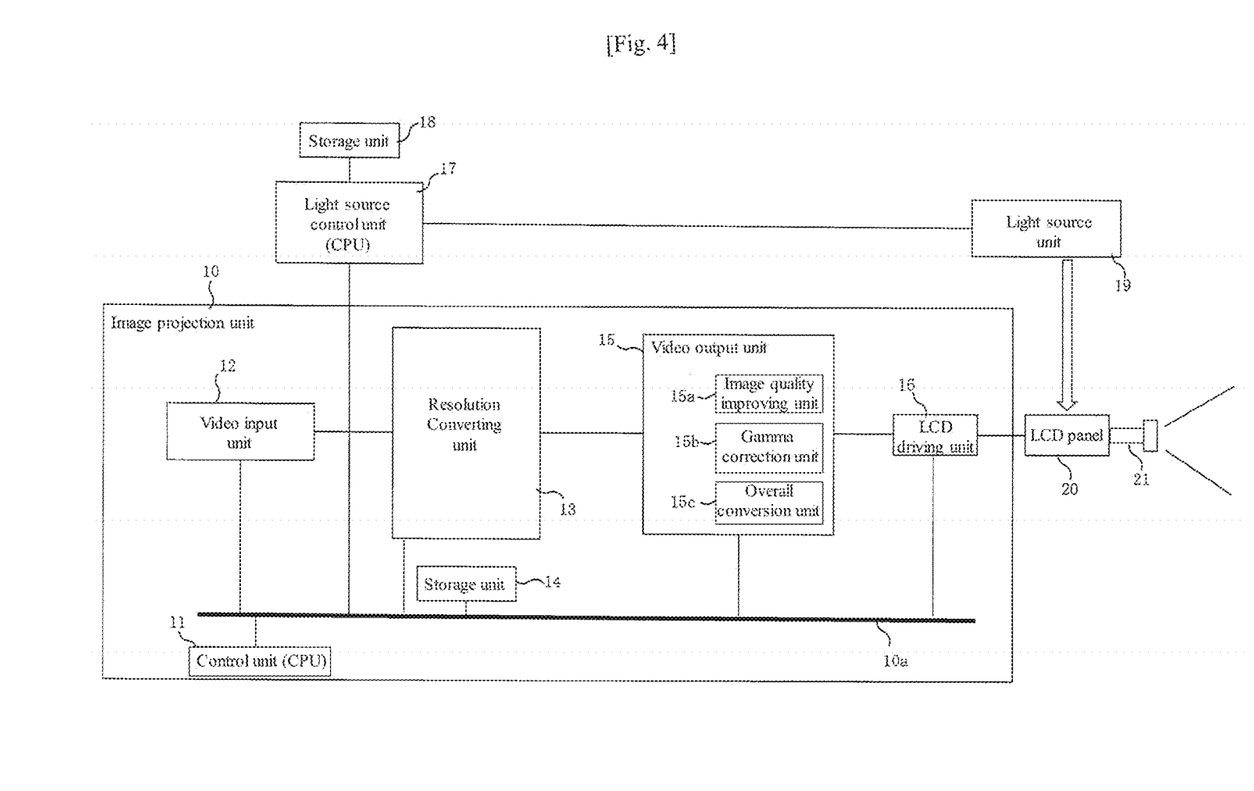
FIG. 4 is a block diagram showing a configuration of a projector according to a third example embodiment of the present invention.

FIG. 4 is a block diagram showing a configuration of a projector according to a third example embodiment of the present invention.

Referring to FIG. 4, the projector includes image projection unit 10, light source control unit 17, storage unit 18, light source unit 19, LCD panel 20 and projection lens 21. Image projection unit 10 includes control unit 11, video input unit 12, resolution converting unit 13, storage unit 14, video output unit 15 and LCD driving unit 16. Light source control unit 17, control unit 11, video input unit 12, resolution conversion unit 13, storage unit 14, video output unit 15 and LCD driving unit 16 are respectively connected to bus 10a.

The video signal is input from an external video supply device to video input unit 12. The video supply apparatus is, for example, a video apparatus, a personal computer, or the like. Video input unit 12 supplies the video signal to resolution conversion unit 13.

Resolution converting unit 13 converts the resolution of the video signal supplied from video input unit 12 to an optimal resolution for display on LCD panel 20. Resolution conversion unit 13 supplies the video signal obtained by converting the resolution to video output unit 15.

Video output unit 15 includes image quality improving circuit 15a, gamma correction unit 15b, and overall conversion unit 15c. Image quality enhancement circuit 15a is composed of an image quality correction circuit and a color space converter, and performs a chromaticity adjustment for obtaining a desired white balance for the video signal. The chromaticity adjustment is the adjustment of the signal level of each color component of R, G and B of the video signal described in the first example embodiment. Gamma correction unit 15b includes an LTU (look-up table) unit that determines the level of the output image with respect to the input image, and performs gamma correction of the video signal. Overall conversion unit 15c is composed of a color space converter and converts the output signal to a high-speed serial interface. Here, the function of the color space converter is, for example, to convert the luminance signal or the color difference signal to the RGB signals.

LCD driving unit 16 drives LCD panel 20 according to the RGB video signals supplied from video output unit 15. LCD panel 20 modulates emitted light from light source unit 19 to form an image based on the video signal. Like image forming unit 3 illustrated in FIG. 1, LCD panel 20 can form a red image, a green image, and a blue image.

Projection lens 21 projects a color image that is composed of the red image, the green image and the blue image that are formed by LCD panel 20.

Light source unit 19 includes a first light source that emits blue light and a second light source that emits yellow light, and emits a mixed light made up of the blue light and the yellow light. First light source 2a and second light source 2b described in the first example embodiment can be used as the first and second light sources.

Storage unit 14 stores data necessary for chromaticity adjustment of the video signal in image quality improving circuit 15a. The data necessary for the chromaticity adjustment of the video signal includes, for example, the gain value of the signal of each color component of R, G, and B corresponding to the difference between the first target chromaticity value and the second target chromaticity value described in the first example embodiment.

Storage unit 18 stores data necessary for the light quantity control of light source unit 19. The data necessary for the light quantity control includes, for example, the driving values of the first and second light sources corresponding to the second target chromaticity value described in the first example embodiment.

Control unit 11 and light source control unit 17 each includes a CPU (central processing unit).

Control unit 11 controls each operation of video input unit 12, resolution converting unit 13, video output unit 15 and LCD driving unit 16. For example, control unit 11 controls the operation of the chromaticity adjustment (control of the signal level of each signal of R, G and B) of image quality improving circuit 15a. More specifically, control unit 11 controls the signal level of each signal of R, G and B based on the gain value of each signal of R, G and B stored in storage unit 14.

For example, when the input values of the R signal, the G signal and the B signal are 255, 255, 255, respectively, the gain values of R, G and B are 1, 0.8, 1, respectively. In this case, the output values of the R signal, the G signal and the Blue signal become 255, 204, 255, respectively. As a result, the signal level of the G signal can be lowered.

Light source control unit 17 controls the light quantity of light source unit 19. For example, light source control unit 17 drives the first and second light sources of light source unit 19 based on the driving values stored in the storage unit 18.

In the projector of the present embodiment, the chromaticity adjustment process for obtaining a desired white balance includes a light quantity control, in which light source control unit 17 controls the light quantity of light source unit 19, and a signal level control in which control unit 11 controls the signal level of each signal of R, G and B. This chromaticity adjustment process is performed in the same procedure as that shown in FIG. 2.

Control unit 11 determines the second target chromaticity value using the xy chromaticity diagram as follows.

Figure 5:
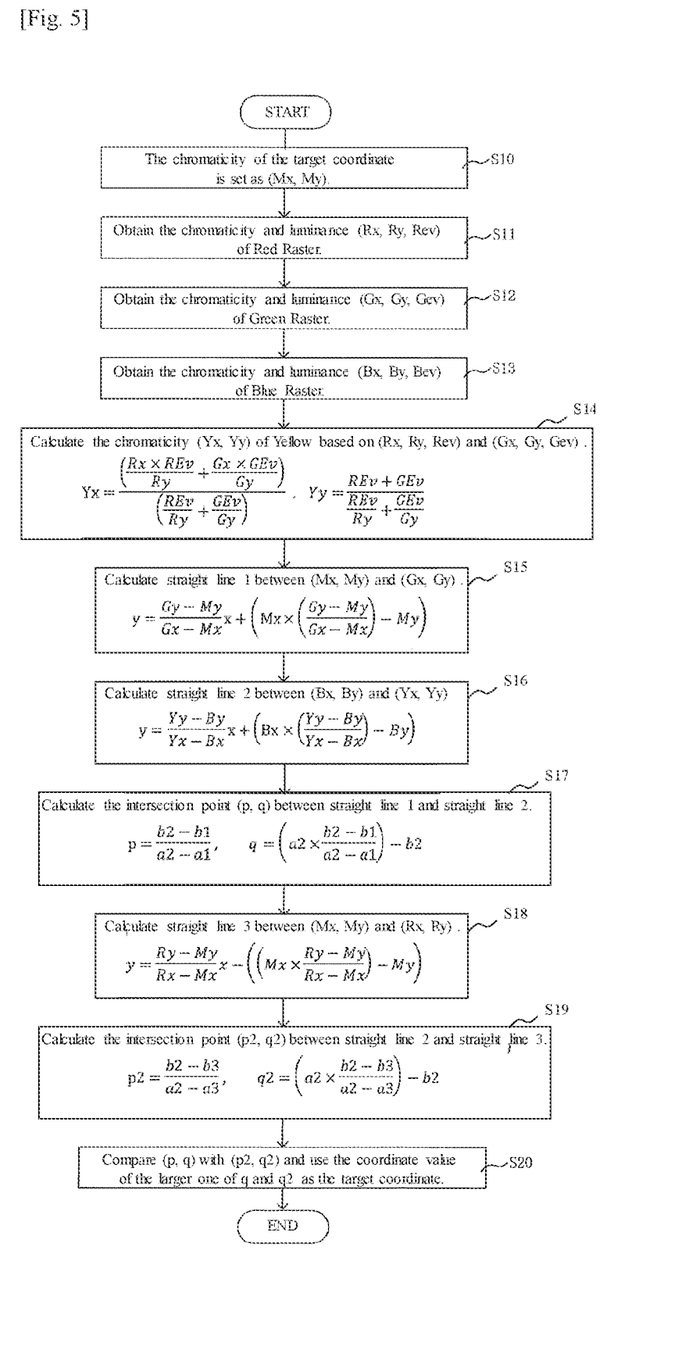
FIG. 5 is a flowchart showing a procedure for determining a second target chromaticity value.

FIG. 5 is a flowchart showing a procedure for determining the second target chromaticity value. Here, a CIE xy chromaticity diagram (specifically, a chromaticity diagram of CIE1391 color space) is used as the xy chromaticity diagram.

First, control unit 11 sets the chromaticity of the target coordinate to (Mx, My) (step S10). The chromaticity (Mx, My) is the coordinate value that indicates the first target chromaticity value.

Next, control unit 11 acquires the chromaticity and luminance (Rx, Ry, Rev) of Red Raster (Step S11). Specifically, control unit 11 forms, as an adjustment image, an all-red image on LCD panel 20. The color illuminometer (not shown) measures the all-red image light from projection lens 21 and outputs the chromaticity value and the luminance value of red light. Control unit 11 acquires the chromaticity and luminance (Rx, Ry, Rev) of the Red Raster from the output of the color illuminometer.

Next, control unit 11 acquires the chromaticity and luminance (Gx, Gy, Gev) of Green Raster (S12). Specifically, control unit 11 forms, as an adjustment image, an all-green image on LCD panel 20. The color illuminometer (not shown) measures the all-green image light from projection lens 21 and outputs the chromaticity value and the luminance value of green light. Control unit 11 acquires the chromaticity and luminance (Gx, Gy, Gev) of the Green Raster from the output of the color illuminometer.

Next, control unit 11 acquires the chromaticity and luminance (Bx, By, Bev) of Blue Raster (Step S13). Specifically, control unit 11 forms, as an adjustment image, an all-blue image on LCD panel 20. The color illuminometer (not shown) measures the all-blue image light from projection lens 21 and outputs the chromaticity value and the luminance value of blue light. Control unit 11 acquires the chromaticity and luminance (Bx, By, Bev) of the Blue Raster from the output of the color illuminometer.

Next, based on the red chromaticity and luminance (Rx, Ry, Rev) and the green chromaticity and luminance (Gx, Gy, Gev), control unit 11 calculates the yellow chromaticity (Yx, Yy) according to the following equation (step S14).

$$Yx = \frac{\left(\frac{Rx \times REv}{Ry} + \frac{Gx \times GEv}{Gy}\right)}{\left(\frac{REv}{Ry} + \frac{GEv}{Gy}\right)}$$ [Equation 1]

$$Yy = \frac{REv + GEv}{\frac{REv}{Ry} + \frac{GEv}{Gy}}$$

Next, based on the chromaticity (Mx, My) of the target coordinate and the green chromaticity (Gx, Gy), control unit 11 calculates straight line 1 according to the following equation (step S15). This straight line 1 corresponds to the third straight line that connects the coordinate point of the G chromaticity value with the coordinate point of the first target chromaticity value described in the first example embodiment.

$$y = \frac{Gy - My}{Gx - Mx}x + \left(Mx \times \left(\frac{Gy - My}{Gx - Mx}\right) - My\right)$$ [Equation 2]

Next, based on the blue chromaticity (Bx, By) and the yellow chromaticity (Yx, Yy), control unit 11 calculates straight line 2 by the following equation (step S16). This straight line 2 corresponds to the second straight line that connects the coordinate point of the B chromaticity value with the coordinate point of the Y chromaticity value described in the first example embodiment.

$$y = \frac{Yy - By}{Yx - Bx}x + \left(Bx \times \left(\frac{Yy - By}{Yx - Bx}\right) - By\right)$$ [Equation 3]

Next, control unit 11 calculates the intersection point (p, q) between straight line 1 and straight line 2 according to the following equation (step S17). The intersection point (p, q) is the coordinate value of the intersection point of the first straight line and the second straight line described in the first example embodiment.

$$p = \frac{b2-b1}{a2-a1} \quad \text{[Equation 4]}$$

$$q = \left(a2 \times \frac{b2-b1}{a2-a1}\right) - b2$$

Next, based on the chromaticity (Mx, My) of the target coordinate and the red chromaticity (Rx, Ry), control unit 11 calculates straight line 3 according to the following equation (step S18). This straight line 3 corresponds to the first straight line that connects the coordinate point of the R chromaticity value with the coordinate point of the first target chromaticity value described in the first example embodiment.

$$y = \frac{Ry-My}{Rx-Mx}x + \left(\left(Mx \times \frac{Ry-My}{Rx-Mx}\right) - My\right) \quad \text{[Equation 5]}$$

Next, control unit 11 calculates the intersection point (p2, q2) between straight line 2 and straight line 3 according to the following equation (step S19). This intersection point (p2, q2) is the coordinate value of the intersection point between the second straight line and the third straight line described in the first example embodiment.

$$p2 = \frac{b2-b3}{a2-a3} \quad \text{[Equation 6]}$$

$$q2 = \left(a2 \times \frac{b2-b3}{a2-a3}\right) - b2$$

Finally, control unit 1 compares the intersection point (p, q) of straight lines 1 and 2 with the intersection point (p2, q2) of straight lines 2 and 3, and sets the intersection point of which the value of y is larger as the target coordinate (step S20). This target coordinate is the second target chromaticity value.

The projector of the present embodiment also exhibits the same effect as that of the first example embodiment.

In the projector of the present embodiment, for example, in the adjustment process before shipment, chromaticity adjustment is performed using the first and second target chromaticity values, thereby obtaining a desired white balance. Then, control unit 11 stores the driving values of the first and second light sources for performing the light quantity control in storage unit 18, and stores the gain value of the signal of each color component of R, G and B for performing the signal level control in storage unit 14. When the user starts the projector after shipment, light source control unit 17 drives the first and second light sources based on the driving values stored in storage unit 18. Further, control unit 11 controls the operation of image quality improving circuit 15a based on the gain values stored in storage unit 14, and adjusts the signal level of each color component of R, G, and B of the video signal.

Generally, there is a difference in the color of projected light (white light) of each projector because there is a variation in the optical characteristics (e.g., transmission/ reflection characteristics, etc.) of the optical components (e.g., dichroic mirror, polarizing plate, LCD panel, etc.) used in the liquid crystal projector. In the adjustment process prior to shipment, by performing the chromaticity adjustment described above for each projector, it is possible to match the hue of projection light (white light) of each projector.

In the projector of the present embodiment, a color temperature setting unit that can selectively set a color temperature from a plurality of color temperatures may be provided. As the color temperature setting unit, for example, a function of setting a color temperature using an OSD (on-screen display) menu can be used. Generally, in the OSD menu, the color temperature can be set in units of 100 k between 5000 k and 10500 k.

In the above case, a first target chromaticity value is set for each color temperature. Storage unit 18 stores the driving values of the first and second light sources corresponding to the second target chromaticity value for each color temperature. Storage unit 14 stores, for each color temperature, the gain value of the signal of each color component of R, G, and B corresponding to the difference between the first target chromaticity value and the second target chromaticity value. When the color temperature is selected by the color temperature setting unit, light source control unit 17 acquires the driving value corresponding to the selected color temperature from storage unit 18, and control unit 11 acquires the gain value corresponding to the selected color temperature from storage unit 14.

Further, in the projector of the present embodiment, control unit 11 and light source control unit 17 may be constituted by one control unit (CPU). This control unit corresponds to control unit 1 described in the first example embodiment.

Further, storage unit 14 and storage unit 18 may be configured by one storage unit. This storage unit corresponds to storage unit 5 described in the first example embodiment.

In the projector of the present embodiment, optical sensor 6 described in the second example embodiment may be provided. In this case, similarly to the second example embodiment, the second target chromaticity value can be determined based on the output value of optical sensor 6.

Further, a DMD may be used instead of LCD panel 20.

The chromaticity adjustment method of the first example embodiment and the projectors of the second and third example embodiments described above are examples of the present invention. The present invention is not limited to the configuration and operation described in the first to third example embodiments. Regarding the structure and details of the present invention, various modifications that can be understood by a person skilled in the art within the scope of the present invention can be made.

EXPLANATION OF REFERENCE NUMBERS

1 Control unit
2 Light source unit
2a first light source
2b second light source
3 Image forming unit
4 Projection lens
5 Storage unit

The invention claimed is:

1. A chromaticity adjustment method of a projector comprising a light source unit that includes a first light source that emits blue light; and a second light source that emits yellow light including red light and green light, said light source unit being configured to emit a mixed light made up of the blue light and the yellow light, said projector being configured to modulate emitted light from said light source unit based on a video signal to form an image, said method comprising:

acquiring at least a chromaticity value of the blue light and obtaining a chromaticity value and a luminance value of each of the red light and the green light;

determining a second target chromaticity value based on a first target chromaticity value set in advance, the chromaticity value of the blue light, and a combination of the chromaticity value and the luminance value of each of the red light and the green light;

controlling light quantities of said first and second light sources based on the second target chromaticity value;

controlling a signal level of each color component of red, green, and blue included in the video signal in response to a difference between the first target chromaticity value and the second target chromaticity value;

calculating a chromaticity value of the yellow light based on the chromaticity value and the luminance value of the red light and the chromaticity value and the luminance value of the green light; and obtaining, on a chromaticity diagram represented by a two-dimensional coordinate of x and y of a tristimulus value of a color stimulus, a first straight line that connects a coordinate point of the chromaticity value of the red light with a coordinate point of the first target chromaticity value, a second straight line that connects a coordinate point of the chromaticity value of the blue light with a coordinate point of the chromaticity value of the yellow light, and a third straight line that connects a coordinate point of the chromaticity value of the green light with a coordinate point of the first target chromaticity value, respectively, comparing a coordinate value of an intersection of the first straight line and the second straight line with a coordinate value of an intersection of the second straight line and the third straight line, and determining the second target chromaticity value based on the coordinate value of which a value of the y is larger.

2. The chromaticity adjustment method according to claim 1, wherein a color temperature can be selectively set from among a plurality of color temperatures, further comprising:

setting the first target chromaticity value for each color temperature;

storing in a storage unit, for each color temperature, a driving value of each of said first and second light sources in accordance with the second target chromaticity value and a gain value of the signal of the each color component in accordance with a difference between the first target chromaticity value and the second target chromaticity value in association with each other; and when a selection of the color temperature is made, obtaining the driving value and the gain value corresponding to the selected color temperature from said storage unit, driving said first and second light sources based on the obtained driving value, and controlling the signal level of the each color component based on the obtained gain value.

3. The chromaticity adjusting method according to claim 1, wherein the yellow light is yellow fluorescent light.

4. A projector comprising:

a light source unit that includes a first light source that emits blue light and a second light source that emits yellow light including red light and green light, said light source unit being configured to emit a mixed light made up of the blue light and the yellow light;

an image forming means for modulating emitted light from said light source unit based on a video signal to form an image;

a projection lens that projects the image;

a control unit that controls a light quantity of each of said first and second light sources so that a chromaticity value of the emitted light of said light source unit becomes a second target chromaticity value that is determined based on a first target chromaticity value set previously, a chromaticity value of the blue light, and a combination of a chromaticity value and a luminance value of each of the red light and the green light; and that controls a signal level of each color component of red, green, and blue included in the video signal in accordance with a difference between the first target chromaticity value and the second target chromaticity value; and a light sensor that detects a portion of the emitted light of said light source and that outputs a chromaticity value and a luminance value of each of the blue, red, and green lights, wherein said control unit calculates, based on the chromaticity value and the luminance value of the red light and the chromaticity value and the luminance value of the green light, a chromaticity value of the yellow light obtains, on a chromaticity diagram represented by a two-dimensional coordinate of x and y of a tristimulus value of a color stimulus, a first straight line that connects a coordinate point of the red chromaticity value with a coordinate point of the first target chromaticity value, a second straight line that connects a coordinate point of the blue chromaticity value with a coordinate point of the yellow chromaticity value, and a third straight line that connects a coordinate point of the green chromaticity value with a coordinate point of the first target chromaticity value, respectively; compares a coordinate value of a intersection of the first straight line and the second straight line with a coordinate value of an intersection of the second straight line and the third straight line; and determines the second target chromaticity value based on the coordinate value of which a value of the y is larger.

5. The projector according to claim 4, further comprising a storage unit that stores a driving value of each of said first and second light sources in accordance with the second target chromaticity value and a gain value of a signal of the each color component in accordance with a difference between the first target chromaticity value and the second target chromaticity value, wherein the control unit drives the first and second light sources based on the driving value stored in said storage unit, and adjusts a signal level of the each color component based on the gain value stored in said storage unit.

6. The projector according to claim 5, further comprising a color temperature setting unit that is capable of selectively setting a color temperature from among a plurality of color temperatures, wherein the first target chromaticity value is set for each color temperature, said storage unit stores, for the each color temperature, the respective driving values of said first and second light source in accordance with the second target chromaticity value and the gain value of the signal of the each color component in accordance with a difference between the first target chromaticity value and the second target chromaticity value, wherein when the color temperature is selected by said color temperature setting unit, said control unit acquires a driving value and a gain value corresponding to the selected color temperature from said storage unit.

7. The projector according to claim 4, wherein said second light source includes an excitation light source that emits blue excitation light and a phosphor that is excited by the blue excitation light and that emits yellow fluorescent light.

8. A chromaticity adjustment method of a projector comprising a light source unit that includes a first light source that emits blue light and a second light source that emits yellow light including red light and green light, said light source unit being configured to emit a mixed light made up of the blue light and the yellow light, said projector being configured to modulate emitted light from said light source unit based on a video signal to form an image, said method comprising:
acquiring at least a chromaticity value of the blue light and obtaining a chromaticity value and a luminance value of each of the red light and the green light;
determining a second target chromaticity value based on a first target chromaticity value set in advance, the chromaticity value of the blue light, and a combination of the chromaticity value and the luminance value of each of the red light and the green light;
controlling light quantities of said first and second light sources based on the second target chromaticity value; and
controlling a signal level of each color component of red, green, and blue included in the video signal in response to a difference between the first target chromaticity value and the second target chromaticity value,
wherein a signal level of blue in the first light source which is a combination of chromaticity and luminance is not being changed, instead a chromaticity of color blue being maintained by considering a difference between its first target chromaticity value and the second target chromaticity value of the light source and adjusting to eliminate the difference, thereby a quantity of the blue which is its luminance is being adjusted by changing which causes less of a blue color overall signal change.

9. The chromaticity adjustment method according to claim 8, wherein a signal level of the red in the second light source which is a combination of chromaticity and luminance is not being changed, instead a chromaticity of color red being maintained by considering a difference between its first target chromaticity value and the second target chromaticity value of the light source and adjusting to eliminate the difference, thereby a quantity of the red which is its luminance is being adjusted by changing which causes less of a red color overall signal change, and
wherein a signal level of the green in the second light source which is a combination of chromaticity and luminance is not being changed, instead a chromaticity of color green being maintained by considering a difference between its first target chromaticity value and the second target chromaticity value of the light source and adjusting to eliminate the difference, thereby a quantity of the green which is its luminance is being adjusted by changing which causes less of a green color overall signal change.

10. The chromaticity adjustment method according to claim 1, wherein a signal level of the red in the second light source which is a combination of chromaticity and luminance is not being changed, instead a chromaticity of color red being maintained by considering a difference between its first target chromaticity value and the second target chromaticity value of the light source and adjusting to eliminate the difference, thereby a quantity of the red which is its luminance is being adjusted by changing which causes less of a red color overall signal change, and
wherein a signal level of the green in the second light source which is a combination of chromaticity and luminance is not being changed, instead a chromaticity of color green being maintained by considering a difference between its first target chromaticity value and the second target chromaticity value of the light source and adjusting to eliminate the difference, thereby a quantity of the green which is its luminance is being adjusted by changing which causes less of a green color overall signal change.

11. The chromaticity adjustment method according to claim 1, wherein a signal level of one of the blue, red, or green in the respective first or second light source which is a combination of chromaticity and luminance is not being changed, instead a chromaticity of a corresponding color blue, red, or green being maintained by considering a difference between its first target chromaticity value and the second target chromaticity value of the light source and adjusting to eliminate the difference, thereby a quantity of the corresponding blue, red, or green, which is its luminance is being adjusted by changing which causes less of the corresponding blue, red, or green color overall signal change.

12. The projector according to claim 4, wherein the control unit is configured to control a signal level of blue in the first light source which is a combination of chromaticity and luminance is not being changed, instead a chromaticity of color blue being maintained by considering a difference between its first target chromaticity value and the second target chromaticity value of the light source and adjusting to eliminate the difference, thereby a quantity of the blue which is its luminance is being adjusted by changing which causes less of a blue color overall signal change.

13. The projector according to claim 12, wherein the control unit is configured to control a signal level of the red in the second light source which is a combination of chromaticity and luminance is not being changed, instead a chromaticity of color red being maintained by considering a difference between its first target chromaticity value and the second target chromaticity value of the light source and adjusting to eliminate the difference, thereby a quantity of the red which is its luminance is being adjusted by changing which causes less of a red color overall signal change, and
wherein the control unit is configured to control a signal level of the green in the second light source which is a combination of chromaticity and luminance is not being changed, instead a chromaticity of color green being maintained by considering a difference between its first target chromaticity value and the second target chromaticity value of the light source and adjusting to eliminate the difference, thereby a quantity of the green which is its luminance is being adjusted by changing which causes less of a green color overall signal change.

14. The projector according to claim 4, wherein the control unit is configured to control a signal level of the red in the second light source which is a combination of chromaticity and luminance is not being changed, instead a chromaticity of color red being maintained by considering a difference between its first target chromaticity value and the second target chromaticity value of the light source and adjusting to eliminate the difference, thereby a quantity of the red which is its luminance is being adjusted by changing which causes less of a red color overall signal change, and wherein the control unit is configured to control a signal level of the green in the second light source which is a combination of chromaticity and luminance is not being changed, instead a chromaticity of color green being maintained by considering a difference between its first target chromaticity value and the second target chromaticity value of the light source and adjusting to eliminate the difference, thereby a quantity of the green which is its luminance is being adjusted by changing which causes less of a green color overall signal change.

15. The projector according to claim 4, wherein the control unit is configured to control a signal level of one of the blue, red, or green in the respective first or second light source which is a combination of chromaticity and luminance is not being changed, instead a chromaticity of a corresponding color blue, red, or green being maintained by considering a difference between its first target chromaticity value and the second target chromaticity value of the light source and adjusting to eliminate the difference, thereby a quantity of the corresponding blue, red, or green, which is its luminance is being adjusted by changing which causes less of the corresponding blue, red, or green color overall signal change.

16. The projector according to claim 4, wherein the image forming means comprises an image forming unit for the projector, and wherein the control unit comprises a controller.

17. The projector according to claim 16, wherein the image forming unit comprises a display device including a light modulator.

* * * * *